United States Patent [19]

Scott

[11] Patent Number: 5,139,708

[45] Date of Patent: Aug. 18, 1992

[54] DUAL CHAMBER CARBONATOR FOR DISPENSING DRINKS

[75] Inventor: Alistair Scott, Cambridge, United Kingdom

[73] Assignee: Isoworth Limited, England

[21] Appl. No.: 588,289

[22] Filed: Sep. 26, 1990

[30] Foreign Application Priority Data

Sep. 27, 1989 [GB] United Kingdom ............... 8921752

[51] Int. Cl.⁵ .............................................. B01F 3/04
[52] U.S. Cl. ...................................... 261/23.1; 222/1;
222/64; 222/129.3; 222/144.5; 261/64.1;
261/DIG. 7
[58] Field of Search .................... 222/129.1–129.4,
222/64, 144.5, 145; 261/DIG. 7, 23.1, 64.1

[56] References Cited

U.S. PATENT DOCUMENTS

| | | | |
|---|---|---|---|
| 2,527,659 | 10/1950 | Smith | 261/DIG. 7 X |
| 3,565,405 | 11/1968 | Black | 261/DIG. 7 X |
| 3,578,214 | 5/1971 | Iannelli | 222/129.1 |
| 3,608,587 | 9/1971 | Zbell | |
| 3,612,495 | 10/1971 | Copping | 261/DIG. 7 X |
| 4,247,018 | 1/1981 | Credle | 222/64 X |
| 4,284,210 | 8/1981 | Horak | 222/68 X |
| 4,448,211 | 5/1984 | Yoshida | |
| 4,518,541 | 5/1985 | Harris | 261/DIG. 7 X |
| 4,531,456 | 7/1985 | Kemp, Jr. et al. | 261/DIG. 7 X |
| 4,580,699 | 4/1986 | Black et al. | 222/129.3 X |
| 4,719,056 | 1/1988 | Scott | 261/DIG. 7 X |
| 4,804,112 | 2/1989 | Jeans | 222/129.1 |
| 4,839,107 | 6/1989 | Rudick et al. | |

FOREIGN PATENT DOCUMENTS

| | | |
|---|---|---|
| A301169 | 2/1989 | European Pat. Off. . |
| 0267973 | 5/1989 | Fed. Rep. of Germany ... 261/DIG. 7 |
| A193064 | 2/1938 | Switzerland . |
| 1147073 | 4/1969 | United Kingdom . |

Primary Examiner—Kevin P. Shaver
Attorney, Agent, or Firm—Lerner, David, Littenberg, Krumholz & Mentlik

[57] ABSTRACT

Water carbonation apparatus for dispensing flavored carbonated drinks supplies carbonation gas to at least two carbonation chambers in each of which water is carbonated and thereafter dispensed to provide a drink. The apparatus has a carbonation selector valve for determining a sequence in which carbonation gas is supplied from the gas supply to each carbonation chamber, and a chamber selector valve for controlling the dispensing of carbonated water from the carbonation chambers in accordance with the desired sequence. The sequence of operations is controlled by a control circuit so that the sequencing of gas supply to and evacuation from the chambers is controlled in conjunction with the operation of the chamber selector valve.

18 Claims, 7 Drawing Sheets

DUAL CHAMBER CARBONATOR FOR DISPENSING DRINKS

BACKGROUND OF THE INVENTION

This invention relates to carbonation apparatus for dispensing drinks, and more particularly to carbonation apparatus in which carbonated water is dispensed with a measured quantity of concentrate to produce a flavored drink.

In applicant's earlier PCT patent application No. 8914420.8, now published application No. W091/00238 there is disclosed carbonation apparatus in which water is carbonated in a carbonation chamber of a given capacity for a single drink. When such apparatus, and indeed other forms of carbonation apparatus, is operated continuously to dispense one drink after another, there are inevitably delays between the dispensing of one drink and the next since a finite time is required for each carbonation cycle. In many situations, these delays do not cause a problem. However, where there is a high demand for drinks, such as where drinks are being prepared for sale, these delays may cause considerable inconvenience. It is this problem which the present invention addresses.

SUMMARY OF THE INVENTION

Accordingly, there is provided water carbonation apparatus for dispensing carbonated drinks, comprising gas supply means for supplying carbonation gas to a carbonation chamber in which a quantity of water is to be carbonated and thereafter dispensed to provide a drink, said apparatus having at least two carbonation chambers and a carbonation selector means for determining a sequence in which carbonation gas is supplied from the gas supply to each carbonation chamber, and further comprising chamber selector means for controlling the dispensing of carbonated water from the carbonation chambers in accordance with said sequence.

Embodiments of the invention will now be described by way of example with reference to the accompanying drawings (FIGS. 1 to 4B are taken from applicants earlier application No. W091/00238) in which:

DETAILED DESCRIPTION OF THE INVENTION

Figure 1:
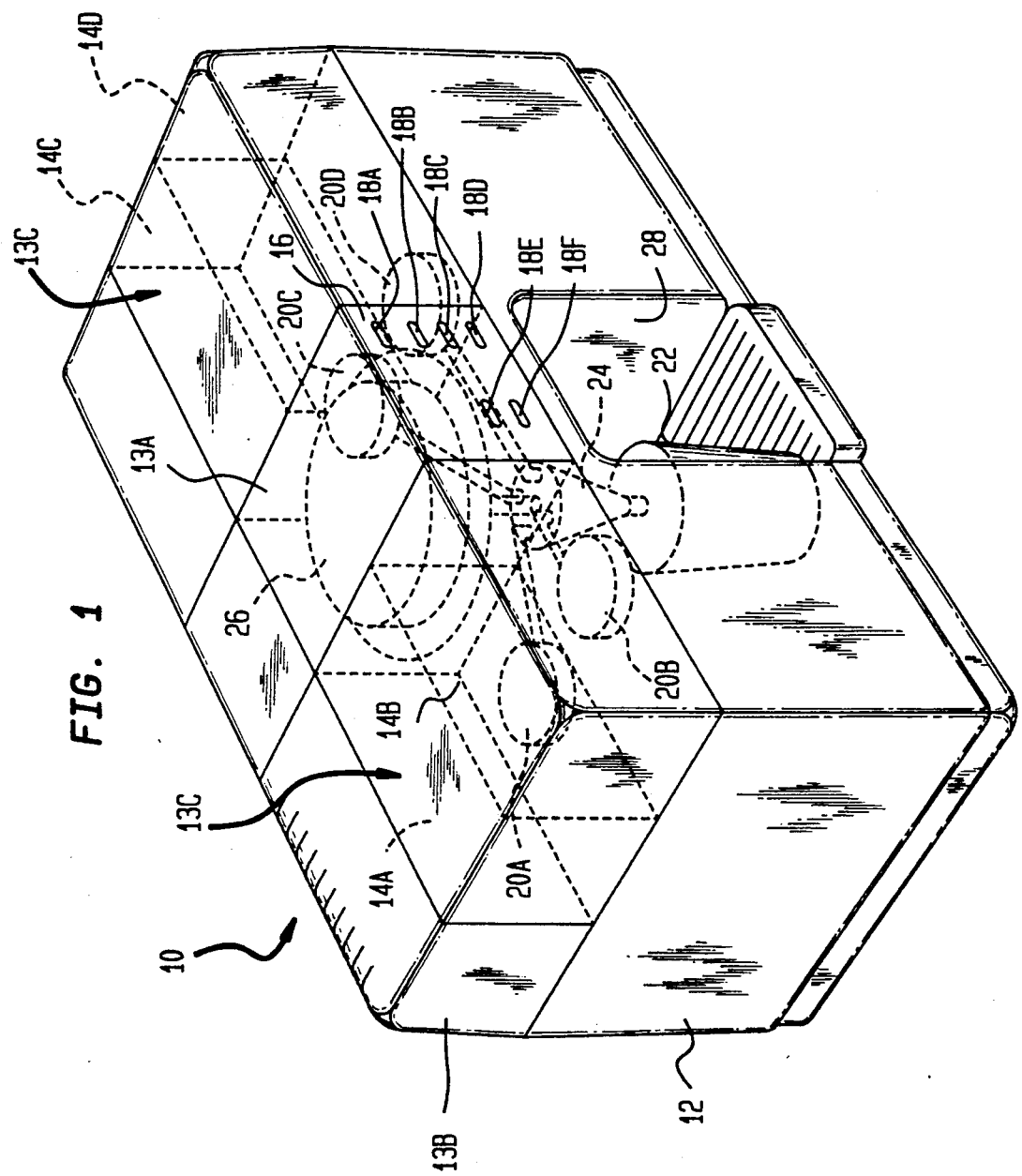
FIG. 1 shows a perspective view of carbonation apparatus for dispensing drinks.

General Description of Apparatus (FIG. 1)

A water carbonation apparatus 10 for preparing drinks which combine carbonated water with an essence or flavoring is shown in FIG. 1. The apparatus comprises a housing 12, the lower section of which is generally rectangular and which has an upper section comprising a central upper portion 13a extending forwardly from a rear upper portion 13b which extends along the rear wall of the housing. The upper portions 13a and 13b define two compartments laterally spaced either side of the upper portion 13a. These compartments have compartment covers 13c and accommodate containers 14a to 14d (the presence of which is illustrated schematically) for concentrate to be mixed with carbonated water to provide the drinks which are dispensed. The compartment covers 13c are formed of a material (or lined with a material) having selected thermally insulating properties in order to insulate the containers 14 and the concentrate therein from the ambient conditions. The containers 14a to 14d may be of the bag-in-box construction in which the outer container is formed of a rigid membrane such as cardboard and the inner container is formed from a foil of a material which will be collapsible as the concentrate is dispensed from the container through an outlet connecting member (not shown). The containers 14 are arranged in pairs 14a,14b and 14c,14d as shown.

The upper portion 13a of the housing provides at the front panel thereof a selection panel 16 which accommodates selection buttons 18a to 18f for the selection of a drink flavored with a particular concentrate by buttons 18a to 18d and to permit selection of still water or carbonated water (without flavoring) by buttons 18e,18f respectively. Each of the containers 14a to 14d are coupled to a concentrate dispensing mechanism 20a to 20d respectively (shown in broken lines). When the user requires a drink he places a glass or cup 22 below a mixing chamber 24 in the form of a nozzle which communicates with a carbonation chamber 26 (shown in broken line) and the concentrate dispensing mechanisms 20a to 20d. The glass 22 has to be placed in a dispensing compartment 28 which opens to the front of the housing 12. There is a sensing mechanism to detect whether a glass 22 is present in compartment 28 before the dispensing of drinks.

Figure 2:
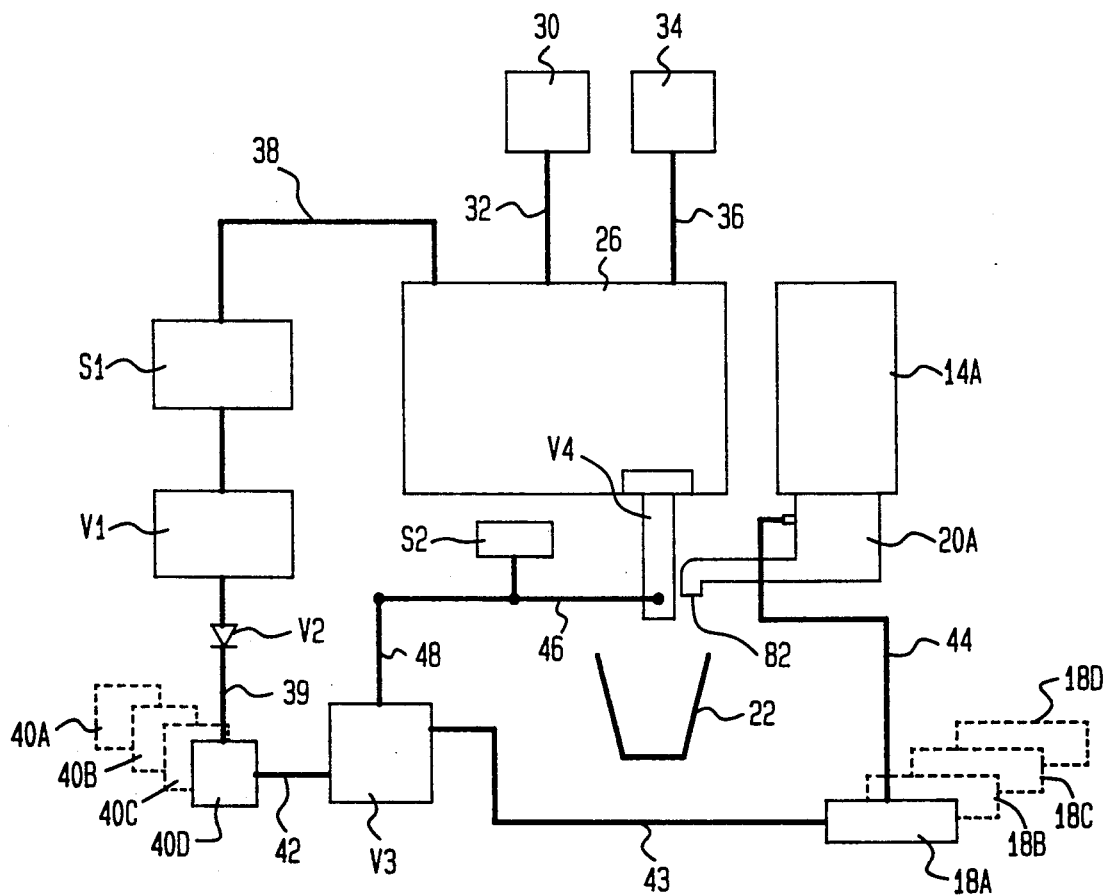
FIG. 2 shows diagramatically carbonation apparatus.

Description of Apparatus of FIG. 2

FIG. 2 shows a schematic diagram of the apparatus 10. A water supply 30 communicates by a water supply line 32 with the carbonation chamber 26. Likewise a gas supply tank or main reservoir 34 containing the carbonation gas such as carbon dioxide, communicates via a gas supply line 36 with the carbonation chamber 26. Both of these lines 32,36 are controlled by valves (e.g. solenoid actuated valves) not shown. Carbonation of the water takes place in chamber 26. The apparatus may be arranged to operate such that the chamber 26 is refilled with water immediately following the dispensing of the previous drink so that the chamber normally stands full of water. After the carbonation step, the carbonation gas which remains in the chamber may pass through exhaust lines 38,39. Exhaust line 38 is controlled by a solenoid valve S1 which operates to permit the gas to pass to an auto exhaust valve V1, which in turn may pass the carbonation gas via exhaust line 39 with a check valve V2 to charge reservoirs 40a to 40d. Typically the pressure of the carbonation gas in the gas supply 34 will be in the order of 6 to 7 bar (about 100 psig) whereas the required pressure in the reservoirs 40a to 40d will be in the order of 2 to 3 bar (about 40 psig). The collective capacity of the four reservoirs 40a to 40d is about four times that of the head space in the carbonation chamber when it is full of carbonated water. After charging the pressure in the reservoirs 40a to 40d will be slightly above the level just indicated due to the carbonation of the water itself since the carbonation gas in the water tends to maintain the pressure in the head space. The reservoirs 40a to 40d are themselves connected by a charge line 42 to a pressure relief valve V3 from which the charge line 43 continues via the selection buttons 18a to 18d (those buttons on panel 16 for the selecting of flavors corresponding to the concentrate in the containers 14a to 14d of FIG. 1). Further, charge lines 44a to 44d run from each of the selection buttons 18 to a respective one of the concentrate dispensing mechanisms 20a to 20d. As shown, the concentrate dispensing mechanism 20a communicates with respective concentrate container 14a. A glass 22 is shown disposed below an outlet from the concentrate dispensing mechanism 20a and a valve V4 of the carbonation chamber 26.

The valve V4 is associated with an arm 46 which is pivotally connected to an actuating solenoid S2 and an actuating member 48 for the pressure relief valve V3.

Operation of Apparatus of FIG. 2

Each selection button 18a to 18d selects a respective one of the concentrate containers 14a to 14d for a particular flavor of the drink dispensed. The selection buttons 18a to 18d are each associated with a respective selection mechanism 50 (not shown). Chamber 26 is already charged with water. The respective concentrate dispensing mechanism 20a is charged with concentrate. Assuming that a glass 22 is in place (i.e. in the compartment 28 of FIG. 1) actuation of the button 18a is possible. This actuation initiates a cycle of the carbonation apparatus. During the cycle, dispensing of concentrate and carbonated water occurs as follows. For the purpose of dispensing concentrate, carbonation gas is caused to flow from the reservoirs 40a to 40d through the charge line 42, the pressure relief valve V3 (when actuated by the solenoid S2), the charge line 43, the concentrate selection mechanism associated with the selection button 18a through the further charge line 44 to the concentrate dispensing mechanism 20a to dispense a measured quantity of the concentrate from the dispensing mechanism 20c which is charged by the concentrate container 14a. Likewise during said cycle, the solenoid S2 is actuated to open the valve V4 to dispense carbonated water from the carbonation chamber 26. The two liquids, the carbonated water and the concentrate, dispensed respectively from the valve V4 of chamber 26 and an outlet mechanism 82 of the concentrate dispensing mechanism 20 are mixed as they pass to the glass 22 (see the mixing chamber 24 of FIG. 1).

Figure 3:
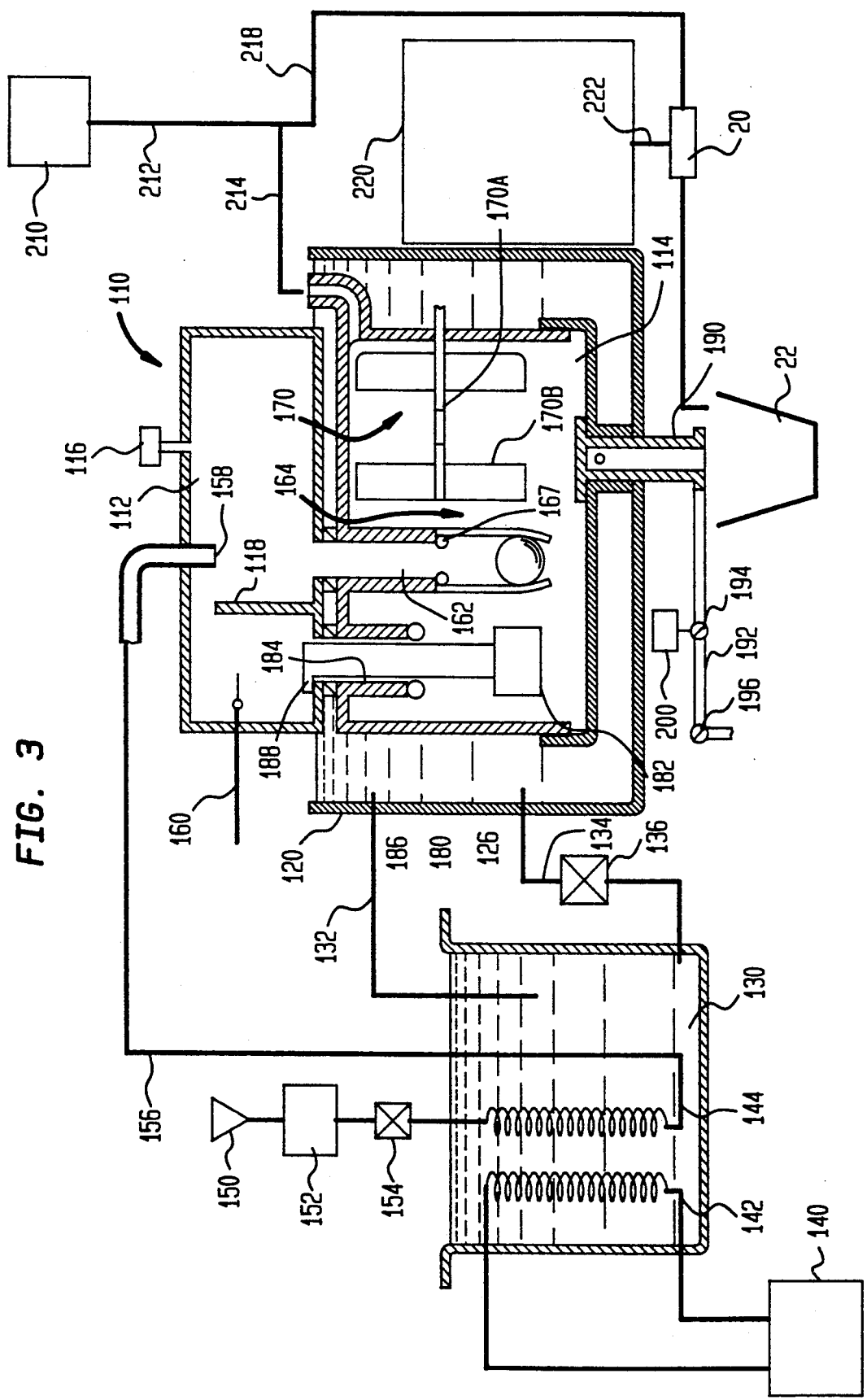
FIG. 3 shows another diagrammatic view of carbonation apparatus.
Figure 4A:
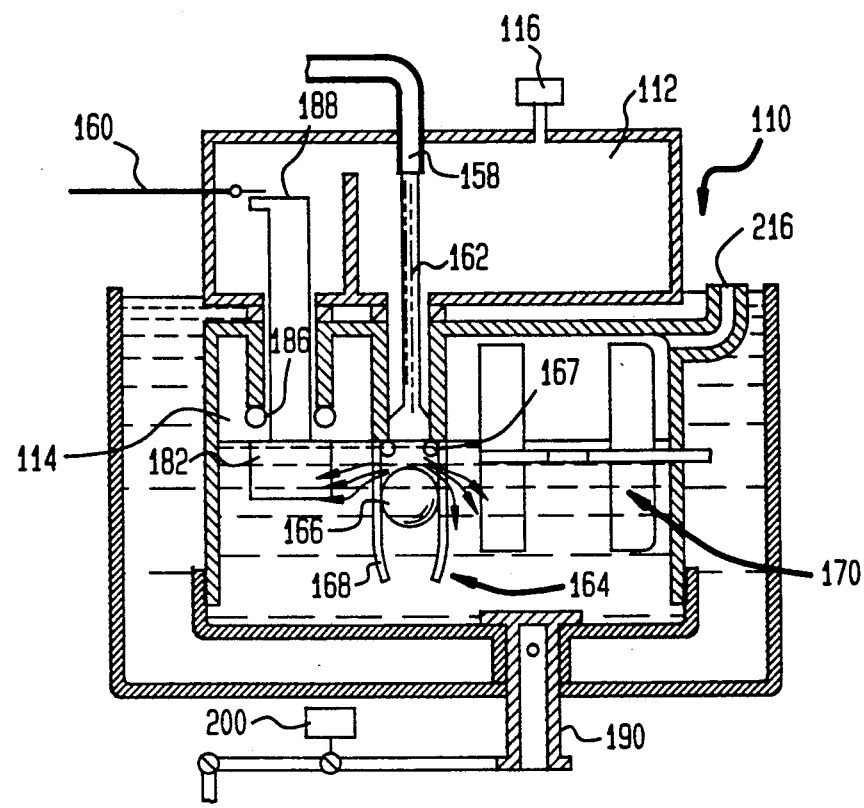
FIGS. 4A, 4B show diagramatically parts of the apparatus of FIG. 3.
Figure 4B:
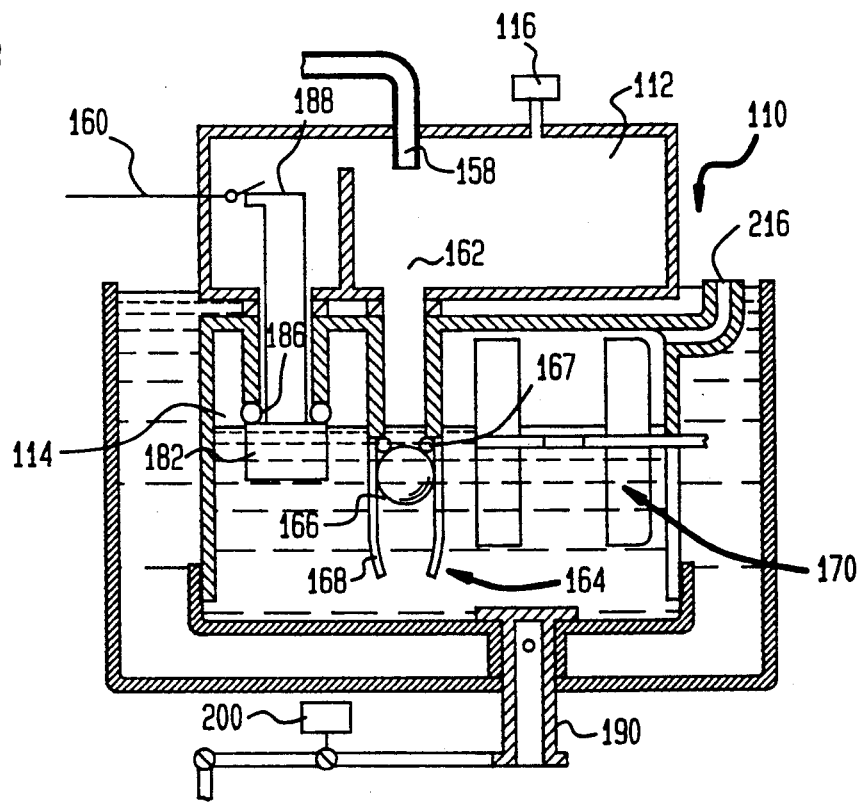

Carbonation Apparatus of FIGS. 3, 4A and 4B

In FIG. 3 there is a schematic diagram of a carbonation apparatus (generally similar to that of FIG. 1). A carbonation chamber 110 is surrounded by a cooling jacket 120. Both the carbonation chamber 110 and the cooling jacket 120 are supplied with water 126 therein from a refrigerating tank 130. The tank 130 is refrigerated by means of the refrigerant compressor 140. Refrigerant circulates in the coil 142 which co-operates with the coil 144 in the tank 130 to chill the water supply. The tank 130 contains water which is cycled via a supply line 134 and a pump 136 to the cooling jacket 120 and returns via a return line 132. The water supply for the chamber 110 comes from a mains supply at 150 via a flow controller 152 and a solenoid valve 154. It passes through the coil 144 in the tank 130 and along a supply line 156. It issues through a water inlet 158 to an upper chamber 112 of the carbonation chamber 110. This upper chamber 112 provides a water supply break between the mains water supply 150 and the agitating chamber 114. Upper chamber 112 is vented to atmosphere through a vent 116. This upper chamber 112 has a baffle 118 which shields sensing means 160 from the water issuing from the inlet 158. Within the agitating chamber 114 there is an inlet conduit 162 which houses a valve 164 comprising a ball 166 and cage 168 for controlling the flow of water into the chamber 114. Also within the chamber 114 is an agitator means 170 for assisting in the carbonation of the water by mechanically forcing carbonation gas from the head space above the water downwardly into the body of the water. It has a horizontal shaft 170a and vertical paddles 170b and is driven by a motor (not shown) under the control of a control circuit (not shown). Metering means 180 meters the level of the water in the chamber 114. This metering means 180 comprises a float valve 182 which is guided in a channel 184 as the water level rises until the float valve 182 itself comes into contact with seal 186. At the same time an upper end 188 of the float valve 182 comes into contact with the sensing means 160. The sensing means 160 is electrically connected to the control circuit which sequences the operation of the apparatus. Valve means 190 control the flow of carbonated water from the agitating chamber 114. This valve means 190 is connected to a beam 192 which is pivoted at 194 and at 196. The valve means 190 is controlled by a solenoid 200. As the valve means 190 moves up, carbonated water flows from the chamber 114 into a glass 22. A reservoir 210 for the supply of carbon dioxide is connected by means of a supply line 212 and a supply line 214 to the inlet 216 at the agitating chamber 114. A further line 218 from the supply line 212 (and thus reservoir 210) connects with a concentrate dispensing mechanism 20 associated with a concentrate container 220. The concentrate dispensing mechanism 20 (FIG. 1) is arranged to issue metered quantities of concentrate (flavoring or syrup) into the glass 22 simultaneously with the supply of carbonated water from the tank 114. Dispensing mechanism 20 is shown linked to concentrate container 220 by a concentrate supply line 222: this arrangement is schematic.

The apparatus of FIG. 4A includes the carbonation chamber 100 of FIG. 3. Components already described have the same references. In FIG. 4A, the water is issuing from inlet 158. The ball 166 of the valve 164 normally floats and is forced downwardly by the supply of water. The supply of water through the upper chamber 112 continues to maintain the ball 166 in a depressed condition in which it cannot seat on an O-ring seal 167. This is especially advantageous since the ball 166 and cage 168 afford a very efficient and very inexpensive form of valve for controlling the supply of water to the agitating chamber 114. Termination of the flow of water into the chamber 114 via the upper chamber 112 occurs when the float valve 182 contacts the seal 186 (as shown in FIG. 4B) simultaneously with the upper end 186 of the float valve 182 actuating the sensing means 160. This actuates the solenoid 154 (FIG. 3) to cut off the water supply through the water inlet 158. During the filling operation, the lower chamber 114 is continually vented by the upper chamber 112 through the vent 116 to atmosphere. The upper chamber 112 provides a break in the water supply between the inlet 158 and the water in the chamber 114. Once the water supplied through the inlet 158 ceases, communication between the chamber 114 and atmosphere through the vent 116 via the upper chamber 112 also ceases. The apparatus is then ready for the next stage of operation which is the carbonation of the water in the agitating chamber 114. This occurs when the carbon dioxide from the container 210 is supplied via the carbonation gas lines 212,214 and inlet 216. The agitator means 170 is rotated for a finite duration. Thereafter the carbonated water can be dispensed through the valve means 190 under the control of solenoid 200 into a glass 22.

Figure 5:
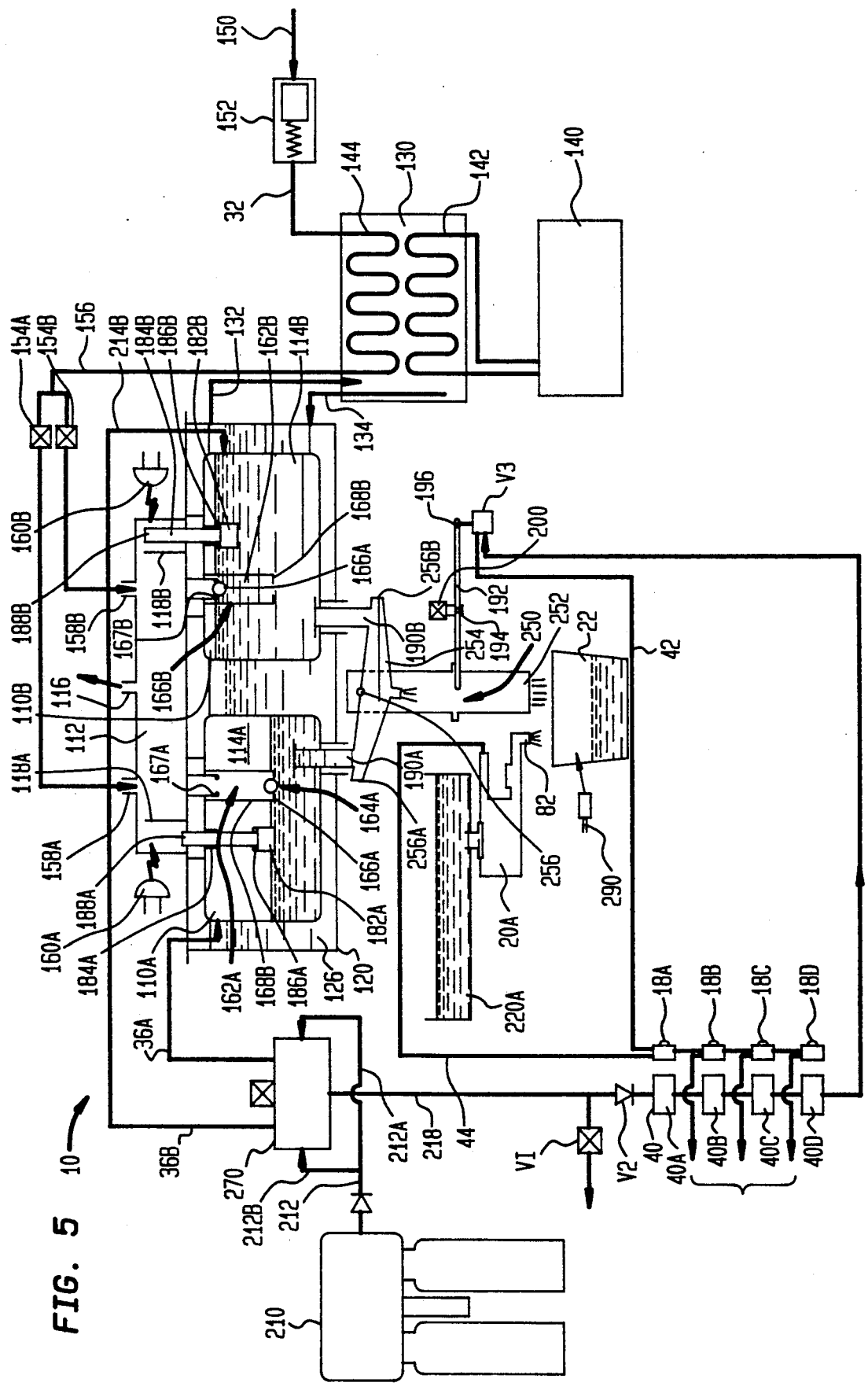
FIG. 5 shows a diagramatic view of carbonation apparatus according to the present invention which corresponds to a modification of the apparatus of FIG. 3.

Carbonation Apparatus of FIG. 5

It will be noted that with the above-described apparatus of my earlier PCT application No. WO91/00238, the dispensing of a flavored drink requires the following successive steps in the cycle, namely (a) charging the carbonation chambers with water, (b) carbonation of the water, and (c) simultaneous dispensing of the carbonated water and the measured quantity of concentrate. It will be understood that steps (a) and (b) delay the dispensing of successive drinks. When drinks are being dispensed commercially, such delays cause inconvenience.

The problem is addressed in a modified embodiment of the water carbonation apparatus which will now be described with reference to FIGS. 5 to 7 in which the carbonation capacity is increased thereby to reduce delays in the dispensing of successive drinks.

The water carbonation apparatus of FIG. 5 is shown schematically and as such it is a modification of the apparatus of FIG. 3. Like reference numerals have been employed. The general description of common aspects of the apparatus is not repeated herein. Instead attention is now given to the features of the apparatus related to the provision of dual carbonation chambers 110A,B whereby the rate of dispensing carbonated water is increased and the users waiting time is reduced. For the two carbonation chambers like parts are distinguished by the suffix A,B respectively.

Each of the dual carbonation chambers 110A,B (and related components some of which are not shown e.g. the agitator means) are similar to the chamber 110 of FIG. 3. It will be noted that the water cooling jacket 120 is common to both. When actuated by solenoid 200 and beam 192 (in similar manner to the valve means 190 of FIG. 3) chamber selector means 250 causes valve means 190A, 190B alternately to dispense carbonated water through chamber selector means 250.

Carbonation selector means 270 (to be further described with reference to FIG. 6) switches carbonation gas from the gas supply 210 from one carbonation chamber to the other. For this purpose the gas supply line 212 is branched with lines 212A, B for supplying lines 36A, B which lead to carbonation chambers 110A, B respectively.

As described with reference to FIG. 2, the selection buttons 18A to 18D select the concentrate (for flavoring a drink) stored in a respective container 14 and associated with a respective dispensing mechanism 20A to 20D, of which only dispensing mechanism 20A is shown in FIG. 5 along with concentrate container 220A. Likewise the residual gas from the head space in the carbonation chambers 110A, B is stored in the reservoirs 40A to 40D.

Figure 6:
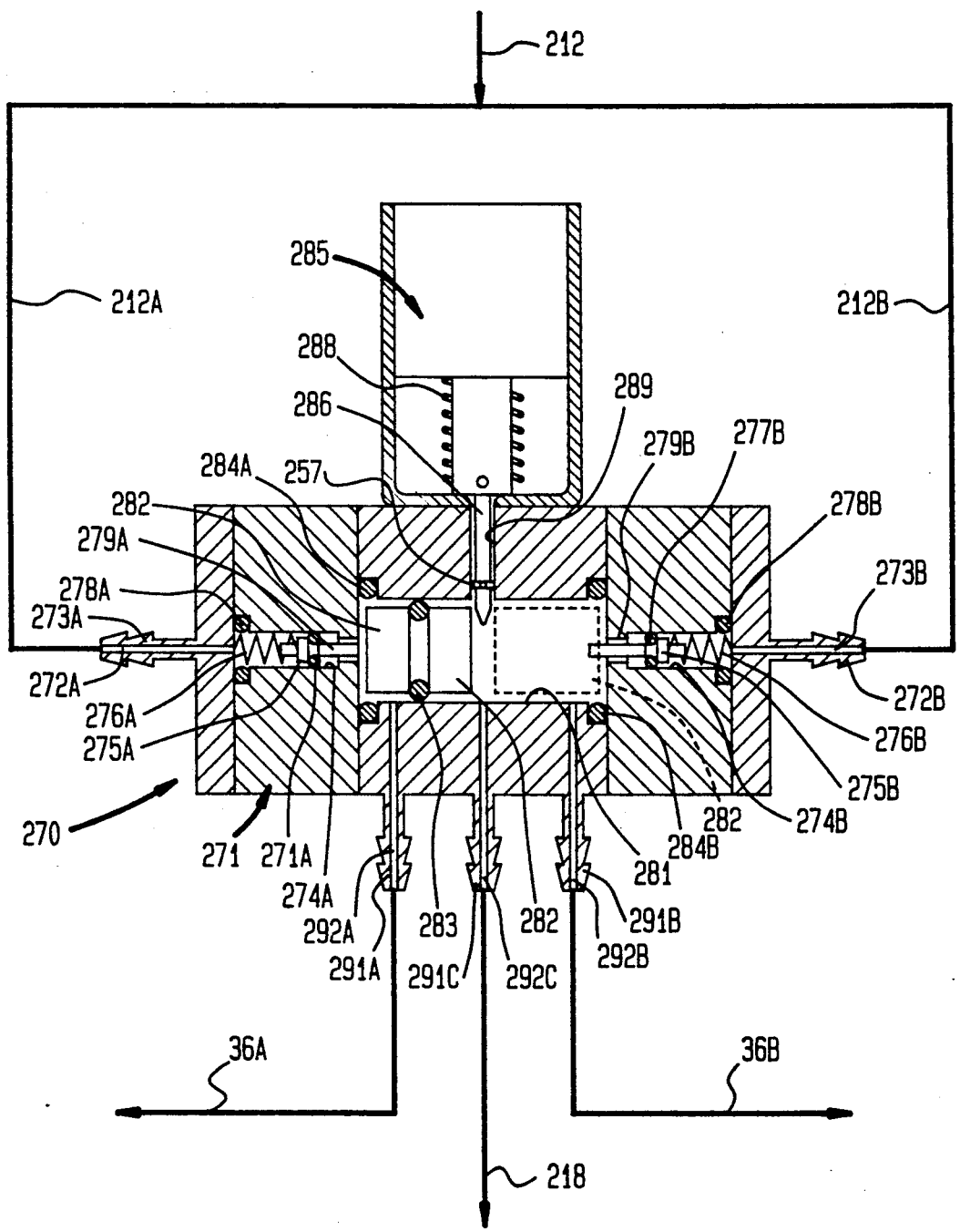
FIG. 6 shows a sectional view through a carbonation selector means for the apparatus of FIG. 5.

The Carbonation Selector Means of FIG. 6

The carbonation selector means 270 determines which of the carbonation chambers 110A, B receives carbonation gas from the gas supply 210. Selector means 270 comprises a housing 271 defining inlet means 272A, B for connection to the gas supply lines 36A, B. Inlet means 272A, B communicate by means of inlet passageways 273A, B with respective valve chambers 274A, B housing valve means 275A, B biassed to their closed positions by valve springs 276A, B. The valve means 275A, B carry valve seals 277A, B to seal the valve chambers 274A, B in the closed positions of the valve means 275A, B. It will be noted that as the housing 271 is of a modular construction, the housing includes valve chamber seals 278A, B. Within the housing 271, valve passages 279A, B communicate between their respective valve chambers 274A, B and a shuttle valve chamber 281 housing shuttle valve 282 which reciprocates in chamber 281. Valve 282 carries a seal 283 and the chamber has seals 284A, B. A given position of the shuttle valve 282 is held by a solenoid 285, though the transport of the valve 282 is determined by gas flowing through one of other of the valve chambers 274A, B and respective valve passage 279A, B. In FIG. 6, the shuttle valve 282 is holding the valve means 275A open to permit gas to flow through the passage 279A. The alternate position of shuttle valve 282 is shown in broken lines.

The solenoid 285 has a plunger 286 which is displaceable reciprocably away from shuttle chamber 281 against the basis of solenoid spring 288. Plunger 286 reciprocates in housing passage 289 which is sealed by the plunger seal 287. Actuation of the solenoid 285 displaces the plunger 286 out of the chamber 281 thereby to permit the shuttle valve 282 to be transported from one position to another.

The housing has outlet means 291A to C with associated outlet passageways 292A to C communicating with the chamber 281 and respective lines 36A, 218 and 36B. Lines 36A,B are directed to the respective carbonation chambers 110A, B whereas line 218 enables the reservoirs 40A to 40D to be recharged.

Operation of the Carbonation Selector Means

During the operating cycle of the carbonation apparatus 10 gas will pass from the gas supply 210 along the line 212. It will branch through 212A, B. If the shuttle valve 282 is in the position shown in FIG. 6, carbonation gas flows via line 212A, valve chamber 274A, passage 279A to shuttle valve chamber 281 and thence via outlet passageway 292A of outlet means 291A to line 36A and thereby to carbonation chamber 110A. At this stage, the solenoid plunger 286 holds the shuttle valve 281 in the position for charging the first carbonation chamber 110A, whereby valve means 275A is maintained opened against the bias of its valve spring 276A. In contrast valve means 275B is biassed into its closed position by its valve spring 276B. When carbonation has been completed in the first carbonation chamber 110A, the gas supply to line 212 is closed off. Subsequently, the solenoid 285 is actuated via a control circuit (FIG. 7). This causes the plunger 286 to be retracted for a brief interval whereby the pressure differential acting on the valve means 275A causes that valve means 275A to shift to its closed position in which it is biassed by the valve spring 276A. At the same time the pressure differential in shuttle valve chamber 281 causes the shuttle valve 282 to switch to the other side of the chamber 281 causing valve 275B to open. In this state of the shuttle valve 282, gas may flow from the supply line 212B into the chamber 281 and out through the outlet passageway 292B to supply line 36B whereby the second carbonation chamber 110B may be charged with carbonation gas. Likewise when carbonation is completed in chamber 110B, the control circuit (FIG. 7) actuates the solenoid 285 for the next movement of the shuttle valve 282 and thereby the next change of state of the carbonation selector means 270. The carbonation selector means 270 also allows the return of waste carbonation gas from the head space of the carbonation chambers 110A, B (after carbonation) via the shuttle valve chamber 281 to the gas line 218 which leads to reservoirs 40A to 40D.

In the shuttle valve position illustrated, carbonation gas from the head space of the second carbonation chamber 110B may flow back via supply line 36B to the shuttle valve chamber 282 and thence through outlet passageway 292C to line 218. The sequence of operations is better understood from the description of the apparatus of FIG. 5.

The Chamber Selector Means

The chamber selector means 250 for selecting which of the first and second carbonation chambers 110A, B is selected to discharge carbonated water will now be described with reference to FIG. 5. Each chamber 110A, B has a respective chamber valve means 190A, B which is actuated in like manner to the valve means 190 of FIG. 3. When the solenoid 200 is actuated, then the beam 192 is actuated. In this embodiment, the beam 192 raises a hollow elevating member 252 which also channels carbonated water supplied thereto to the glass 22.

A tilt means 254 is pivotally connected to the elevating member 252 whereby as the elevating member 252 rises the tilt means 254 endeavours to raise the valve means 190A, B.

Tilt means 254 comprises boss means 256A, B for engagement with the valve means 190A, B. The arrangement is such that as a boss means 256A raises its valve means 190A, this causes carbonated water to flow from the carbonation chamber 110A through a passage (not shown) internally of the boss 256A through the body of the tilt means 254 and to issue from a downwardly extending opening thereof so as to pass through a passage in the elevating member 252 to the vessel/glass 22 (FIG. 5). A similar sequence occurs when the boss 256B is operative to raise the valve means 190B associated therewith.

As the elevating member 252 is raised, tilt means 254 brings its boss means 256A, B into contact with the valve means 190A, B. Assume that water in the chamber 110A has been carbonated and excess gas is exhausted from its head space. Assume also that carbonation of the water in chamber 190B has just commenced and the head space thereof is being supplied with carbonation gas. Consequently, as the elevating member 252 rises, the tilt means 254 meets less resistance from the valve means 190A which it begins to raise. At the same time tilt means 254 pivots about its pivot point 256 (due to the pressure acting on the valve means 190B) so that only the valve means 190A is raised.

It will be appreciated that when the relative pressure values within the chambers 190A, B are reversed, then the valve means 190B opens discharging chamber 110B, whilst the valve means 190A remains closed and the water in chamber 190A is carbonated.

Operation of the Apparatus of FIG. 5

On start-up the carbonation chambers 110A, B are charged with water. At the next stage in the cycle, gas flows to the carbonation selector means 270 and the initial position of the shuttle valve 282 thereof determines that carbonation gas flows through a selected one of the supply lines for example supply line 36A causing water in the respective chamber 110A to be carbonated. After a suitable interval sufficient for carbonation in chamber 110A, the gas supply via line 212 is closed off. Subsequently, the solenoid 285 of the selector means 270 is actuated, whereby the shuttle valve 282 switches position. Thereafter the residual carbonation gas in the head space of the chamber 110A is used to charge reservoirs 40A to 40D.

The selector means 270 (due to the change in position of the shuttle valve 282) is now in the state to supply carbonation gas to second carbonation chamber 110B when the gas supply via line 212 resumes.

Now assume that at this stage in the cycle, a selection button 18 is pressed. This results in evacuation of gas from chamber 110A (as afore described). Shortly thereafter gas is supplied via carbonation selector means 270 to the second carbonation chamber 110B. It is at this stage that the control circuit (FIG. 7) actuates solenoid 200 whereby the beam 192 causes upward movement of the chamber selector means 250. This causes actuation of a respective one of the valve means 190A, B thereby to dispense carbonated water to the glass 22. Simultaneously, the beam 192 actuates the valve V3 whereby gas from reservoirs 40A to 40D is directed via the respective selection mechanism (not shown, but associated with the actuated selection button 18) to an associated one of the dispensing mechanisms 20A to 20D to dispense a measured quantity of concentrate.

It will be noted that the presence of the glass 22 is detected by sensor means 290 which provides a control signal to the control circuit whereby the detected absence of a glass 22 prevents the dispensing cycle commencing by locking the buttons 18A to D.

The operation is such that if chamber 110A was last charged, then carbonation selector means 270 on the next cycle directs carbonation gas through line 36B to charge carbonation chamber 110B. Similarly, chamber selector means 250 is responsive to the pressure in the chambers 110A, B thereby to dispense alternate carbonated water from the last charged chamber.

Control Circuit

Figure 7:
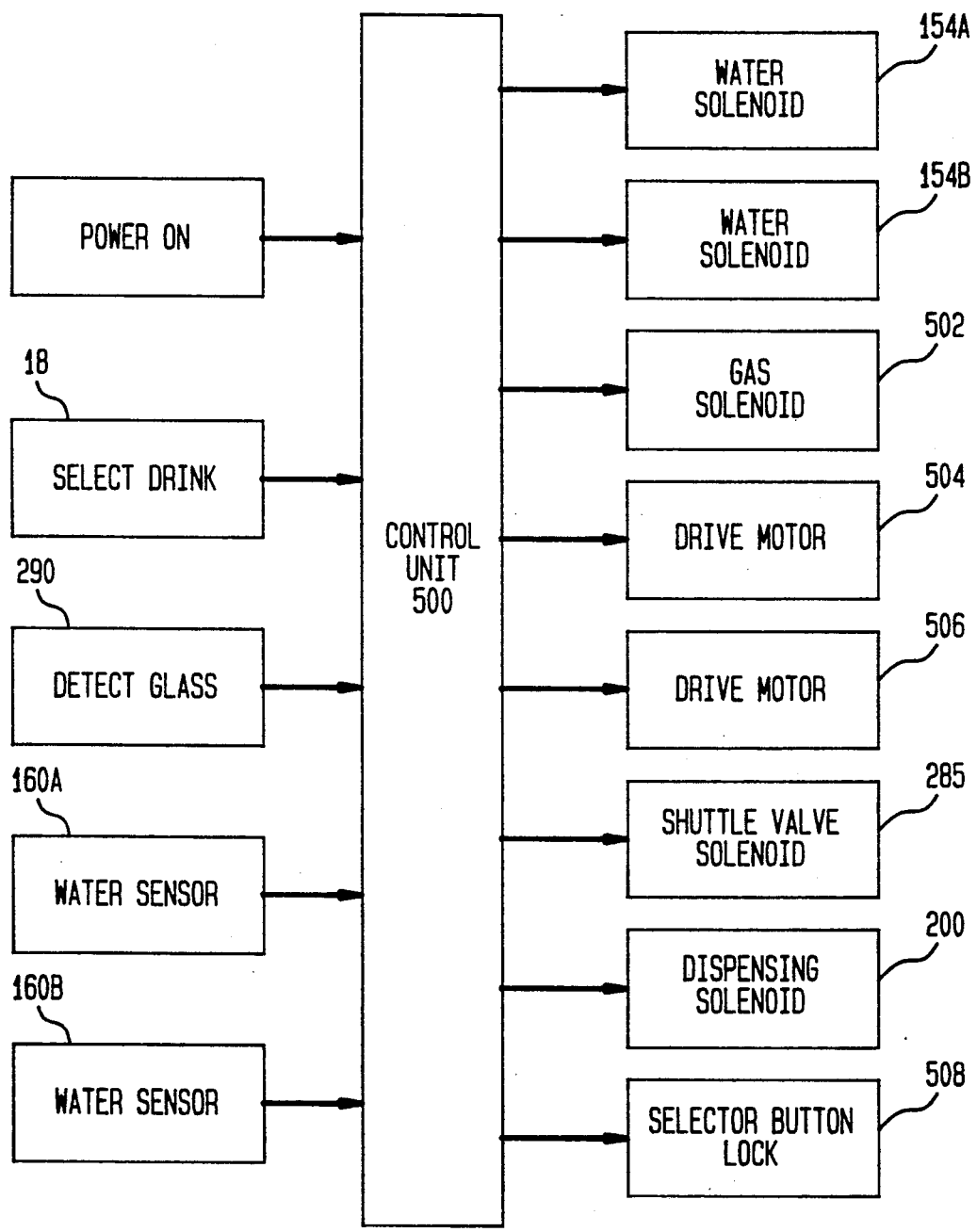
FIG. 7 shows a control circuit for the operation of the apparatus of FIGS. 5 and 6.

With reference to FIG. 7 a control unit 500 receives input signals from a power on sensor (not shown in FIG. 5), the select buttons 18A to D, the glass sensor 290, and the two water sensors 160A and 160B. The outputs from the control unit 500 are connected to the water control solenoids 154A and 154B, a gas supply control solenoid 502 (not shown in FIG. 5), drive motors 504 and 506 for the respective rotors in the carbonation chambers 110A and 110B, solenoid 285 which controls the shuttle 282, dispensing solenoid 200 and a locking device 508 which locks the buttons 18A to 18B against actuation in the absence of a signal from sensor 290 indicating that a glass is present, which locking device is not shown in previous drawings.

In operation, on start-up a signal from the power on sensor causes the controller 500 (assuming that initially both carbonation chambers 110A and B are empty) to actuate both solenoids 154A and B so that both chambers are filled with water. Upon receipt of signals from the respective sensors 160A and B, the solenoids 154A and B are de-energised, the carbonation chambers at this point having been filled to the required level with water. Thereafter the controller 500 outputs a signal to energise the gas solenoid 502 so that one of the carbonation chambers, say 110A, receives carbon dioxide gas under pressure. A pressure regulating valve (not shown) ensures that the pressure in the carbonation chamber does not exceed a predetermined value. After the pressure in the carbonation chamber has reached the required value, the controller 500 (either as a result of sufficient time having expired or in response to a pressure sensing transducer which is not shown) energises motor 504 so as to carbonate the water in chamber 110A. During the operation of the motor, further gas may be admitted to the carbonation chamber via the pressure regulating valve mentioned above in order to maintain the pressure at the required level during carbonation.

After a time sufficient for carbonation to have been completed in chamber 110A, controller 500 de-energises motor 504 and energises solenoid 285 to supply gas from chamber 110A via line 218 to the reservoirs 40A to 40D and open valve 275B.

The carbonator chamber 110A then remains at reduced pressure (e.g. 30 p.s.i.) until a drink is selected.

Assume that a glass 22 is inserted so that a signal via detector 290 to control unit 500 outputs a signal via selector button lock 508 to release selection buttons 18A to D. When a drink is selected by the use of one of buttons 18A to 18D, then an exhaust valve (not shown) opens to vent the gas in chamber 110A to atmosphere and the gas solenoid 502 opens to supply gas to the chamber 110B via valve 285B which, as described above, is already open.

After a short delay sufficient for the pressure in chamber 110A to have reduced to atmosphere and that in chamber 110B to have increased to that required for carbonation, controller 500 actuates solenoid 200 so as simultaneously to dispense the carbonated water from chamber 110A by the chamber selector means 270 as previously described and to supply gas from reservoirs 40A to 40D to the selected one of the concentrate dispensers 20A to 20D by a valve V3. In this way a carbonated drink is dispensed with water from chamber 110A. Meanwhile chamber 110B has been carbonated and the gas supply thereto closed by gas solenoid 502, the motor 506 having been operative for the duration required. Again, solenoid 285 is then actuated to supply gas from chamber 110B to the reservoirs 40A to 40D, the pressure in chamber 110B being reduced (e.g. to 30 psi) as described in connection with chamber 110A above. Chamber 110A is also at this time re-filled with water. The apparatus is held in this condition i.e. with carbonated water in chamber 110B and chamber 110B at a pressure (e.g. 30 psi) which is above atmosphere but below the carbonation pressure and uncarbonated water in chamber 110A (unpressurised) until a selector button is again depressed to dispense the carbonated water from chamber 110B and the selected flavoring.

From here on the cycle continues with water being carbonated alternately in chambers 110A, B.

It will be seen that with the apparatus of FIGS. 5 to 7 delays in dispensing drinks are greatly reduced, since whilst one carbonation chamber is dispensing carbonated water the other carbonation chamber can be carbonating water for the next drink.

Although the embodiment of FIG. 5 has only two carbonation chambers, the invention extends to apparatus with more then two such chambers such as three or four with appropriate control means whereby carbonation and dispensing cycles in the respective chambers may overlap as described.

I claim:

1. Water carbonation apparatus for dispensing carbonated drinks, comprising at least two independent carbonation chambers, gas supply means for supplying carbonation gas to a selected one of said at least two carbonation chambers in which a quantity of water is to be carbonated so as to provide said carbonated water therein, carbonation selector means for selectively coupling said gas supply means to said selected one of said at least two carbonation chambers, and chamber selector means for dispensing said carbonated water from said selected one of said at least two carbonation chambers, each of said at least two carbonation chambers defining a volume substantially corresponding to a single drink.

2. Apparatus as claimed in claim 1, wherein said at least two independent carbonation chambers comprise first and second carbonation chambers, said carbonation selector means comprising first and second inlet passageways for supplying said gas to said carbonation selector means, first and second outlets connected to said first and second carbonation chambers, first and second valve means associated with said first and second inlet passageways for controlling the flow of gas into a selected one of said first and second outlets for communicating carbonation gas to respective ones of said first and second carbonation chambers, shuttle valve activating means displaceable between first and second positions each of which renders a corresponding one of said first and second valve means operable, and means for displacing said shuttle valve activating means from one of said first and second positions to the other of said first and second positions so as to alternately select between said first and second carbonation chambers.

3. Apparatus as claimed in claim 2, further comprising solenoid-actuated means for holding said shuttle valve activating means in a predetermined position in which one of said first and second valve means is in an open condition and the other of said first and second valve means is in a closed condition.

4. Apparatus as claimed in claim 3, wherein said first and second inlet passageways include means for supplying gas from said gas supply means for pneumatically switching said shuttle valve activating means from said predetermined position to another position in which said one of said first and second valve means is in said closed position and said other of said first and second valve means is in said open position upon release of said solenoid-actuated means.

5. Apparatus as claimed in claim 1, wherein each of said at least two independent carbonation chambers includes chamber valve means associated therewith, each of said chamber valve means being displaceably openable to cause water to be dispensed, and wherein said chamber selector means displaces said chamber valve means selectively in accordance with the pressure within said chamber acting thereon.

6. Apparatus as claimed in claim 5, wherein said chamber selector means comprises an elevating member and a tilt member pivotally connected to said elevating member, said tilt member being connected to said chamber valve means to displace one of said chamber valve means in accordance with the pressure acting thereon.

7. Apparatus as claimed in claim 6, wherein said tilt member includes a pair of laterally spaced bosses, each of said bosses being located so as to cooperate with an associated one of said chamber valve means, said tilt member including a conduit through which carbonated water from a chamber of an actuated chamber valve means passes to be dispensed.

8. Apparatus for selectively dispensing carbonated water from water carbonation apparatus having a plurality of carbonation chambers, each of said carbonation chambers having a displaceably actuated chamber valve means associated therewith for dispensing said carbonated water therefrom, said apparatus comprising an elevating member displaceable towards said carbonation chambers, a tilt member pivotally mounted upon said elevating member and rockable into a plurality of positions, whereby in each of said plurality of positions said tilt means selectively actuates a corresponding one of said chamber valve means to dispense carbonated water therefrom.

9. Carbonated drink dispensing apparatus comprising first and second carbonation chambers, supply means for supplying water and gas to said first and second carbonation chambers for the formation of carbonated water therein, first and second carbonated water dispensing valves associated with each of said first and second carbonation chambers and openable against the action of pressure therewithin, and valve actuating means connected to each of said first and second carbonated water dispensing valves, said valve actuating means being operable so that when there is a pressure difference between one of said first and second carbonation chambers and the dispensing valve associated with said one of said first and second carbonation chambers which is at a lower pressure, said carbonation chamber is opened while said dispensing valve associated with the other of said first and second carbonation chambers which is at a higher pressure remains closed.

10. Water carbonation apparatus for dispensing carbonated drinks comprising at least two carbonation chambers, gas supply means for supplying carbonation gas to a selected one of said at least two carbonation chambers in which a quantity of water is to be carbonated, carbonation selector means for selectively coupling said gas supply means to a selected one of said at least two carbonation chambers, chamber selector means for dispensing carbonated water from said selected one of said at least two carbonation chambers, said chamber selector means comprising at least two valve means communicating with said respective carbonation chambers for selectively allowing the passage of said carbonated water from said carbonation chambers, and pressure actuated valve opening means for selectively opening one of said at least two valve means, said valve opening means being responsive to the pressures within said at least two carbonation chambers to select a respective one of said at least two valve means to be opened.

11. Apparatus according to claim 10 wherein said at least two valve means are positioned to be normally held closed by the pressure within said at least two carbonation chambers, and said valve opening means comprises actuator means mounted to apply an opening force to said one of said at least two valve means against said pressure, so as to first open said one of said at least two valve means which communicates with said carbonation chamber having the lowest internal pressure.

12. Apparatus according to claim 11 wherein said actuator means comprises an axially movable member displaceable towards said one of said at least two valve means, pivot bearing means upon said axially movable member, and a rocker member pivotally mounted to said pivot bearing means, said rocker member being connected to engage and act to open said one of said at least two valve means, and to pivot upon opening said valve means, so that further displacement of said axially movable member does not open another of said at least two valve means.

13. A method of operating apparatus for dispensing carbonated drinks comprising at least two carbonation chambers, said method comprising supplying water to said at least two carbonation chambers, supplying carbonation gas to one of said at least two carbonation chambers to effect carbonation therein, rerouting said carbonation gas to the other of said at least two carbonation chambers, exhausting residual carbonation gas from said one of said at least two carbonation chambers, so as to ensure that the gas pressure in said one of said at least two carbonation chambers is reduced to a level substantially corresponding to atmospheric pressure, and dispensing a drink from said one of said at least two carbonation chambers.

14. A method of dispensing a carbonated drink from apparatus including at least two carbonation chambers, said method comprising supplying water to one of said at least two carbonation chambers, supplying carbonation gas to said one of said at least two carbonation chambers so as to effect carbonation therein, dispensing a carbonated drink from said one of said at least two carbonation chambers, supplying water to the other of said at least two carbonation chambers before said dispensing of said drink from said one of said at least two carbonation chambers, supplying carbonation gas to said other of said at least two carbonation chambers, and dispensing a drink from said other of said at least two carbonation chambers.

15. A method of dispensing a carbonated drink from apparatus comprising at least two carbonation chambers comprising supplying water to one of said at least two carbonation chambers, supplying carbonation gas to said one of said at least two carbonation chambers so as to effect carbonation therein, and dispensing said carbonated drink from said one of said at least two carbonation chambers, supplying water to said other of said at least two carbonation chambers, supplying carbonation gas to said other of said at least two carbonation chambers for effecting carbonation therein, and dispensing a drink from said other of said at least two carbonation chambers, and detecting a signal indicating that a drink is required thereby causing said supply of said water to said one of said at least two carbonation chambers and said dispensing of said water from said other of said at least two carbonation chambers.

16. A method of operating carbonated drink dispensing apparatus comprising at least two carbonation chambers, said method comprising performing an operating cycle which includes supplying water to one of said at least two carbonation chambers, supplying carbonation gas to said one of said at least two carbonation chambers for effecting carbonation therein, and supplying water to the other of said at least two carbonation chambers.

17. The method of claim 16 including maintaining said one of said at least two carbonation chambers at an elevated pressure which is less than the pressure required for said carbonation.

18. The method of claim 16 comprising maintaining said other of said at least two carbonation chambers at atmospheric pressure.

* * * * *